(12) United States Patent
Nakamura et al.

(10) Patent No.: US 11,063,315 B2
(45) Date of Patent: Jul. 13, 2021

(54) LAMINATING ADHESIVE, LAMINATE USING THE SAME, AND SECONDARY BATTERY

(71) Applicant: DIC Corporation, Tokyo (JP)

(72) Inventors: Hidemi Nakamura, Tokyo (JP); Takatoshi Matsuo, Tokyo (JP); Tatsuya Kouyama, Tokyo (JP)

(73) Assignee: DIC CORPORATION, Tokyo (JP)

( * ) Notice: Subject to any disclaimer, the term of this patent is extended or adjusted under 35 U.S.C. 154(b) by 199 days.

(21) Appl. No.: 16/096,050

(22) PCT Filed: May 10, 2016

(86) PCT No.: PCT/JP2016/063838
§ 371 (c)(1),
(2) Date: Oct. 24, 2018

(87) PCT Pub. No.: WO2017/195266
PCT Pub. Date: Nov. 16, 2017

(65) Prior Publication Data
US 2019/0131595 A1      May 2, 2019

(51) Int. Cl.
| | |
|---|---|
| *H01M 50/183* | (2021.01) |
| *B32B 7/12* | (2006.01) |
| *B32B 15/085* | (2006.01) |
| *C09J 11/06* | (2006.01) |
| *C09J 123/20* | (2006.01) |
| *C09J 163/00* | (2006.01) |
| *B32B 15/092* | (2006.01) |
| *H01M 50/10* | (2021.01) |
| *H01M 4/62* | (2006.01) |

(52) U.S. Cl.
CPC .......... *H01M 50/183* (2021.01); *B32B 7/12* (2013.01); *B32B 15/085* (2013.01); *B32B 15/092* (2013.01); *C09J 11/06* (2013.01); *C09J 123/20* (2013.01); *C09J 163/00* (2013.01); *H01M 4/628* (2013.01); *H01M 50/10* (2021.01); *B32B 2457/10* (2013.01); *Y02P 20/141* (2015.11)

(58) Field of Classification Search
CPC ....... B32B 7/12; B32B 15/085; B32B 15/092; B32B 2457/10; B32B 2457/18; C09J 11/06; C09J 123/10; C09J 123/20; C09J 123/28; C09J 151/06; C09J 163/00; H01M 2/02; H01M 2/0275; H01M 2/0287; H01M 2/08; H01M 4/628; Y02P 20/149

See application file for complete search history.

(56) References Cited

U.S. PATENT DOCUMENTS

| | | | |
|---|---|---|---|
| 10,072,116 | B2 | 9/2018 | Kawabe et al. |
| 10,072,143 | B2 | 9/2018 | Ohfuji et al. |
| 2008/0236916 | A1 | 10/2008 | Heller et al. |
| 2016/0009923 | A1* | 1/2016 | Mitsumoto ............... G02B 1/14 428/336 |
| 2016/0036013 | A1 | 2/2016 | Nakazato et al. |
| 2016/0280828 | A1* | 9/2016 | Kawabe ............... C09D 151/06 |
| 2017/0088753 | A1 | 3/2017 | Nakamura et al. |
| 2017/0096586 | A1 | 4/2017 | Sakata et al. |

FOREIGN PATENT DOCUMENTS

| | | |
|---|---|---|
| JP | 8-193148 A | 7/1996 |
| JP | 9-283101 A | 10/1997 |
| JP | 2010-277959 A | 12/2010 |
| JP | 2016-825 A | 1/2016 |
| JP | 2016-35035 A | 3/2016 |
| WO | 2007/017043 A1 | 2/2007 |
| WO | 2015/068385 A1 | 5/2015 |
| WO | WO 2015/068385 * | 5/2015 |
| WO | 2015/190411 A1 | 12/2015 |
| WO | 2016/042837 A1 | 3/2016 |

OTHER PUBLICATIONS

International Search Report dated Jun. 21, 2016, issued in counterpart application No. PCT/JP2016/063838 (1 page).

* cited by examiner

*Primary Examiner* — Anca Eoff
(74) *Attorney, Agent, or Firm* — Westerman, Hattori, Daniels & Adrian, LLP

(57) ABSTRACT

An object of the present invention is to provide a laminating adhesive composition for a laminate, the composition having excellent adhesion between a metal layer and a plastic layer of a laminate, electrolyte solution resistance even after low-temperature aging, and a high retention percentage of the resistance, and allowing no delamination between layers to occur over time; a method for producing the laminating adhesive composition; a laminate using the adhesive; and a secondary battery. The object is achieved by providing a laminating adhesive containing a polyolefin resin (A) and an epoxy compound (B). The polyolefin resin (A) is a polymer in which propylene and 1-butene are the main monomers and has a crystallization peak temperature within the range of 28° C. to 38° C.

13 Claims, 4 Drawing Sheets

LAMINATING ADHESIVE, LAMINATE USING THE SAME, AND SECONDARY BATTERY

CROSS REFERENCE TO RELATED APPLICATIONS

This application is a National Stage Entry of PCT/JP2016/063838, filed May 10, 2016; the entire contents is herein incorporated by reference.

TECHNICAL FIELD

The present invention relates to a laminating adhesive for sealing an electrolyte used in a secondary battery, a laminate using the laminating adhesive, and a secondary battery.

BACKGROUND ART

Secondary batteries typified by lithium-ion batteries have a structure including a positive electrode, a negative electrode, and an electrolyte solution enclosed therebetween. A laminate formed by bonding a metal foil, such as an aluminum foil, or a vapor-deposited metal layer and plastic together is used as an enclosing bag for enclosing lead wires used for outputting electricity from the positive electrode and the negative electrode.

For example, PTL 1 provides an enclosing bag that is formed of a laminate including the innermost layer formed of a maleic acid-modified polyolefin resin and that has the heat-sealed portion formed of the same maleic acid-modified polyolefin resin. Because of such a structure, the enclosing bag has improved reliability in terms of sealing properties. A maleic acid-modified polyolefin resin has excellent adhesion and excellent heat-sealing properties with respect to metal and is thus typically used as an adhesive resin. However, if used as the above sealing film of batteries, despite a maleic acid-modified polyolefin resin exhibiting high adhesive strength soon after laminating is performed at high temperature, a maleic acid-modified polyolefin resin has low electrolyte solution resistance and allows delamination to occur between layers over time. Thus, a maleic acid-modified polyolefin resin cannot be used as a sealing film.

PTL 2 describes a laminate for a battery electrolyte solution sealing film or a laminate for a battery electrode protective film. Such laminates include a metal layer, a surface treatment layer formed on the surface of the metal layer, and an adhesive resin layer that is formed of a polyolefin prepared by modifying carboxylic acid groups or derivatives thereof that have been formed on the surface treatment layer.

PTL 3 describes an adhesive resin composition. The adhesive resin composition includes a polyolefin-based resin (A) containing at least one functional group selected from a group consisting of acid anhydride groups, carboxyl groups, and metal carboxylates and epoxidized vegetable oil (B) that has two or more epoxy groups and that has a molecular weight of 3000 or less. The mixing ratio of the component (B) is 0.01 to 5 parts by mass relative to 100 parts by mass of the component (A).

PTL 4 describes a resin composition for a binder of secondary battery electrodes. The resin composition contains an acid-modified polyolefin resin (A) and a polyurethane resin (B). The ratio of (B) is 0.5 to 100 parts by mass relative to 100 parts by mass of (A).

CITATION LIST

Patent Literature

PTL 1: Japanese Unexamined Patent Application Publication No. 9-283101
PTL 2: International Publication No. WO2007017043
PTL 3: Japanese Unexamined Patent Application Publication No. 8-193148
PTL 4: Japanese Unexamined Patent Application Publication No. 2010-277959

SUMMARY OF INVENTION

Technical Problem

An object of the present invention is to provide a laminating adhesive composition for a laminate, the composition having excellent adhesion between a metal layer and a plastic layer of a laminate, electrolyte solution resistance even after low-temperature aging, and a high retention percentage of the resistance and allowing no delamination to occur between layers over time; a method for producing the laminating adhesive composition; a laminate using the adhesive; and a secondary battery, by providing a novel laminating adhesive.

Solution to Problem

The present inventors have conducted studies and achieved the above object by providing a laminating adhesive containing a polyolefin resin (A) and an epoxy compound (B). The polyolefin resin (A) is a polymer in which propylene and 1-butene are the main monomers and has a crystallization peak temperature within the range of 28° C. to 38° C.

The method according to the present invention for producing an adhesive includes performing aging within the range of 25° C. to 80° C. and thus provides a laminate that achieves an object of the present invention.

Advantageous Effects of Invention

The present invention provides a laminating adhesive composition for a laminate, the composition having excellent adhesion between a metal layer and a plastic layer of a laminate, electrolyte solution resistance even after low-temperature aging, and a high retention percentage of the resistance and allowing no delamination to occur between layers over time; a method for producing the laminating adhesive composition; a laminate using the adhesive; and a secondary battery.

The method for producing an adhesive includes performing aging within the range of 25° C. to 80° C. and thus provides a laminate that achieves an object of the present invention. The temperature is lower than a typical treatment temperature. This leads to energy saving in production, and thus, the cost can be reduced.

DESCRIPTION OF EMBODIMENTS

Figure 1:
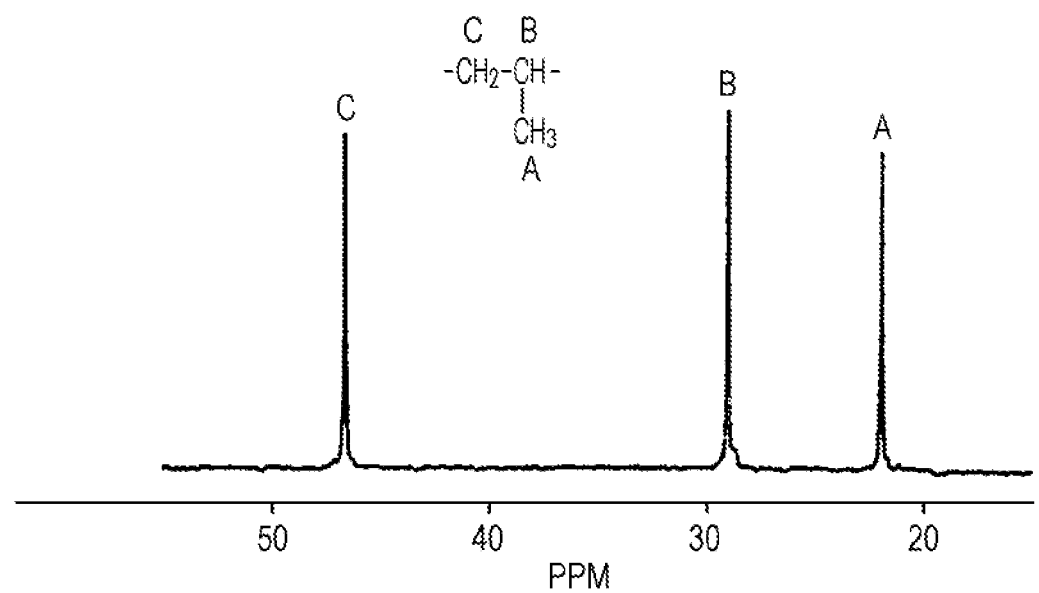
FIG. 1 is a $^{13}$C NMR chart of a polypropylene used as a standard sample.

To achieve the object, the present invention includes the following.

1. A laminating adhesive containing a polyolefin resin (A) and an epoxy compound (B), wherein the polyolefin resin (A) is a polymer in which propylene and 1-butene are the main monomers and has a crystallization peak temperature within the range of 28° C. to 38° C.

2. The laminating adhesive according to 1, wherein the polyolefin resin (A) contains a modified polyolefin resin having an acid value of 1 to 200 mgKOH/g and/or a modified polyolefin resin having a hydroxyl value of 1 to 200 mgKOH/g.

3. The laminating adhesive according to 1 or 2, wherein an essential component of the epoxy compound (B) is an epoxy compound that has two or more epoxy groups per molecule and one or more hydroxyl groups per molecule and that has a weight-average molecular weight of 3000 or less.

4. The laminating adhesive according to any one of 1 to 3, wherein 0.01 to 30 parts by mass of the epoxy compound (B) is blended relative to 100 parts by mass of the polyolefin resin (A).

5. The laminating adhesive according to any one of 1 to 4, further containing a thermoplastic elastomer, a tackifier, a catalyst, a phosphate compound, a melamine resin, a silane coupling agent, or a reactive elastomer.

6. A laminate containing the laminating adhesive according to any one of 1 to 5 between a metal layer and a polyolefin resin layer.

7. A method for producing the laminate according to 6, the method including performing aging within the range of 25° C. to 80° C.

8. A secondary battery comprising the laminate according to 6 or a laminate obtained by the method according to 7, wherein the laminate is used as an electrolyte solution sealing film or an electrode protective film.

(Polyolefin Resin (A))

A polyolefin resin (A) according to the present invention is a polymer in which propylene and 1-butene are the main monomers and has a crystallization peak temperature within the range of 28° C. to 38° C.

If the crystallization peak temperature is below 28° C., electrolyte solution resistance (retention percentage) is low. If the crystallization peak temperature is above 38° C., initial adhesiveness is decreased.

The phrase "propylene and 1-butene are the main monomers in the polyolefin resin (A)" denotes that the polyolefin resin (A) is a polymer in which the total number of moles of propylene and 1-butene, which are used as monomers, is 50% or more relative to the number of moles of all monomers.

In particular, the total number of moles of propylene and 1-butene is preferably 80% or more relative to the number of moles of all monomers.

The polyolefin resin (A) according to the present invention may contain another monomer, such as ethylene, as long as propylene and 1-butene are the main monomers in the polyolefin resin (A). In this case, the polyolefin resin (A) is preferably a polymer in which the number of moles of another monomer is less than the number of moles of each of propylene and 1-butene. More preferably, another monomer is not included.

Here, the ratio of moles of propylene, 1-butene, and ethylene, which are monomers constituting the polyolefin resin (A), is determined in accordance with their peak heights of the $^{13}$C NMR spectrum.

Examples of the polyolefin resin (A) according to the present invention include copolymers of olefins having 2 to 8 carbon atoms and copolymers of olefins having 2 to 8 carbon atoms and other monomers.

Specific examples include polyethylenes, such as high-density polyethylene (HDPE), low-density polyethylene (LDPE), and linear low-density polyethylene resins; polypropylene; polyisobutylene; poly(1-butene); poly(4-methylpentene); polyvinylcyclohexane; polystyrene; poly(p-methylstyrene); poly(α-methylstyrene); α-olefin copolymers, such as ethylene/propylene block copolymers, ethylene/propylene random copolymers, ethylene/butene-1 copolymers, ethylene/4-methyl-1-pentene copolymers, and ethylene/hexene copolymers; ethylene/vinyl acetate copolymers; ethylene/acrylic acid copolymers; ethylene/methyl methacrylate copolymers; ethylene/vinyl acetate/methyl methacrylate copolymers; and ionomer resins. In addition, chlorinated polyolefins obtained by chlorinating the above polyolefins may be used.

In addition, the polyolefin resin (A) according to the present invention has a crystallization peak temperature within the range of 28° C. to 38° C. Here, the crystallization peak temperature in the present invention refers to the top temperature of a crystallization peak. Melting is performed with the temperature raised and cooling is performed to form a resin, and thereafter, when melting is performed again, such a crystallization peak is obtained. Here, the top temperature of a crystallization peak in the present invention is measured by a differential scanning calorimetry method (DSC method).

In the present invention, polyolefin resins having different crystallization peak temperatures may be used alone or in a combination and are not limited as long as the crystallization peak temperature is within the range of 28° C. to 38° C.

A crystallization peak heat quantity described in, for example, Examples is a value calculated from the area of a crystallization peak. Melting is performed with the temperature raised and cooling is performed to form a resin, and thereafter, when melting is performed again, such a crystallization peak is obtained.

The polyolefin resin (A) according to the present invention may contain a modified polyolefin resin having an acid value of 1 to 200 mgKOH/g and/or a modified polyolefin resin having a hydroxyl value of 1 to 200 mgKOH/g.

As described above, various resins may be used as the polyolefin resin (A) in the present invention. In particular, modified polyolefin resins obtained by introducing various functional groups (e.g., carboxyl groups and hydroxyl groups) into polyolefin resins are more preferable. Among such modified polyolefin resins, a modified polyolefin resin having an acid value of 1 to 200 mgKOH/g (hereinafter, referred to as an acid-modified polyolefin resin) and/or a modified polyolefin resin having a hydroxyl value of 1 to 200 mgKOH/g (hereinafter, referred to as a hydroxyl group-modified polyolefin resin) is more preferable because adhesiveness of the metal layer is further improved and electrolyte solution resistance is high.

The acid-modified polyolefin resin refers to a polyolefin resin having carboxyl groups and carboxylic anhydride groups in the molecule thereof and is synthesized by modifying a polyolefin with an unsaturated carboxylic acid or a derivative of the unsaturated carboxylic acid. The method for modification may be graft modification or copolymerization.

The acid-modified polyolefin resin is a graft modified polyolefin obtained by graft-modifying or copolymerizing an unmodified polyolefin resin with at least one polymerizable ethylenically unsaturated carboxylic acid or a derivative thereof. Examples of the unmodified polyolefin resin include the above-described polyolefin resins. Among them, preferable examples include homopolymers of propylene and copolymers of propylene with an α-olefin. They may be used alone or in a combination of two or more.

Examples of the ethylenically unsaturated carboxylic acid and derivatives thereof used for graft modification or copolymerization of an unmodified polyolefin resin include acrylic acid, methacrylic acid, maleic acid, itaconic acid, citraconic acid, mesaconic acid, maleic anhydride, 4-methylcyclohex-4-ene-1,2-dicarboxylic anhydride, bicyclo[2.2.2]oct-5-ene-2,3-dicarboxylic anhydride, 1,2,3,4,5,8,9,10-octahydronaphthalene-2,3-dicarboxylic anhydride, 2-octa-1,3-diketospiro[4.4]non-7-ene, bicyclo[2.2.1]hept-5-ene-2,3-dicarboxylic anhydride, maleopimaric acid, tetrahydrophthalic anhydride, methyl-bicyclo[2.2.1]hept-5-ene-2,3-dicarboxylic anhydride, methyl-norbornene-5-ene-2,3-dicarboxylic anhydride, and norborn-5-ene-2,3-dicarboxylic anhydride. Maleic anhydride is preferably used. These may be used alone or in a combination of two or more.

Various methods can be used to graft a graft monomer selected from ethylenically unsaturated carboxylic acids and derivatives thereof onto an unmodified polyolefin resin. Examples of such methods include a method including melting a polyolefin resin and adding a graft monomer to the polyolefin resin to cause a grafting reaction; a method including dissolving a polyolefin resin in a solvent to make a solution and adding a graft monomer to the solution to cause a grafting reaction; and a method including mixing a polyolefin resin dissolved in an organic solvent with the unsaturated carboxylic acid, heating the mixture to a temperature equal to or higher than the softening temperature or melting point of the polyolefin resin, and performing a radical polymerization and a hydrogen abstraction reaction simultaneously in a melting state. In each of the methods, a grafting reaction is preferably performed in the presence of a radical polymerization initiator in order to graft-copolymerize graft monomers efficiently. The grafting reaction is typically performed under a condition of 60° C. to 350° C. Typically, the ratio of the radical initiator used respective to 100 parts by mass of an unmodified polyolefin resin is within the range of 0.001 to 1 part by mass.

A radical initiator may be used in the adhesive according to the present invention. Preferred examples of the initiator include, but are not limited to, imidazole-based radical initiators.

Examples of the radical initiator include triphenylphosphine, 1,8-diazabicyclo(5.4.0)undecene-7(DBU)-phenoxide, and DBU-octylate.

Examples of the acid-modified polyolefin resin include maleic anhydride-modified polypropylenes, ethylene-(meth)acrylic acid copolymers, ethylene-acrylate-maleic anhydride terpolymers, and ethylene-methacrylate-maleic anhydride terpolymers. Specific examples include commercial products such as "MODIC" manufactured by Mitsubishi Chemical Corporation, "ADMER" and "UNISTOLE" manufactured by Mitsui Chemicals, Inc., "TOYO-TAC" manufactured by TOYOBO Co., Ltd., "YOUMEX" manufactured by Sanyo Chemical Industries, Ltd., "REXPEARL EAA" and "REXPEARL ET" manufactured by Japan Polyethylene Corporation, "PRIMACOR" manufactured by The Dow Chemical Company, "NUCREL" manufactured by DUPONT-MITSUI POLYCHEMICALS CO., LTD., and "BONDINE" manufactured by ARKEMA K.K.

The hydroxyl group-modified polyolefin resin is a polyolefin resin having hydroxyl groups in the molecule thereof and is synthesized by graft-modifying or copolymerizing a polyolefin with a hydroxyl group-containing (meth)acrylate or a hydroxyl group-containing vinyl ether that will be described later. The unmodified polyolefin resin and the method for modification are the same as those for the acid-modified polyolefin resin.

Examples of the hydroxyl group-containing (meth)acrylate include hydroxyethyl (meth)acrylate; hydroxypropyl (meth)acrylate, glycerol (meth)acrylate; lactone-modified hydroxyethyl (meth)acrylate, polyethylene glycol (meth)acrylate, and polypropylene glycol (meth)acrylate. Examples of the hydroxyl group-containing vinyl ether include 2-hydroxyethyl vinyl ether, diethylene glycol monovinyl ether, and 4-hydroxybutyl vinyl ether.

(Epoxy Compound (B))

Examples of the epoxy compound (B) according to the present invention include diglycidyl ether-type epoxy resins prepared from ethylene glycol, propylene glycol, hexanediol, neopentyl glycol, trimethylolethane, trimethylolpropane, pentaerythritol, glycerol, diglycerol, sorbitol, spiroglycol, or hydrogenated bisphenol A.

Other examples of the epoxy compound (B) include aromatic epoxy resins, such as diglycidyl ether-type epoxy resins prepared from bisphenol A, bisphenol F, bisphenol S, or bisphenol AD, and novolac-type epoxy resins that are glycidyl ethers of phenol novolac resins and cresol novolac resins; and diglycidyl ether-type epoxy resins prepared from polyols, such as ethylene oxide adducts and propylene oxide adducts of aromatic polyhydroxy compounds.

Still other examples of the epoxy compound (B) include polyglycidyl ether-type epoxy resins prepared from polyether polyols, such as polyethylene glycol, polypropylene glycol, and polytetramethylene glycol; and alicyclic-type polyepoxy resins prepared from, for example, bis(3,4-epoxycyclohexylmethyl) adipate or 3,4-epoxycyclohexylmethyl-3',4'-epoxycyclohexyl carboxylate.

Still other examples of the epoxy compound (B) include polyglycidyl ester-type epoxy resins prepared from polycarboxylic acids, such as propanetricarboxylic acid, butanetetracarboxylic acid, adipic acid, phthalic acid, terephthalic acid, and trimellitic acid; and bisepoxy resins prepared from hydrocarbon-based dienes, such as butadiene, hexadiene, octadiene, dodecadiene, cyclooctadiene, α-pinene, and vinylcyclohexene.

Still other examples of the epoxy compound (B) include epoxy resins prepared from diene polymers, such as polybutadiene and polyisoprene; glycidylamine-type epoxy resins prepared from, for example, tetraglycidyl diaminodiphenylmethane, tetraglycidyl bisaminomethylcyclohexane, diglycidylaniline, or tetraglycidyl-m-xylylenediamine; and epoxy resins having various heterocycles, such as triazine and hydantoin.

Among such resins, aromatic epoxy resins, such as bisphenol A-type epoxy resins, are preferably used because good adhesiveness and corrosion resistance are obtained.

Specific examples of the bisphenol A-type epoxy resin include "EPICLON 850, 860, 1050, 1055, and 2055" manufactured by DIC CORPORATION and "jER828, 834, 1001, 1002, 1004, and 1007" manufactured by Mitsubishi Chemical Corporation.

An epoxy resin, an essential component of which is an epoxy compound that has two or more epoxy groups per molecule and one or more hydroxyl groups per molecule and that has a weight-average molecular weight of 3000 or less, may be used.

It is preferable that 0.01 to 30 parts by mass of the epoxy compound (B) be blended relative to 100 parts by mass of the polyolefin resin (A).

If the amount is less than 0.01 parts by mass, adhesive strength with respect to a base material is decreased, which is not preferable.

If the amount is more than 30 parts by mass, cohesive strength of a coated film is decreased, which is not preferable.

(Another Additive)

In the present invention, another additive, such as a known and commonly used thermoplastic elastomer, tackifier, catalyst, phosphate compound, melamine resin, silane coupling agent, or reactive elastomer, may be used. The amount of such an additive may appropriately be adjusted as long as the functions of the adhesive according to the present invention are not impaired.

(Laminate)

A laminate according to the present invention is obtained by laminating, by using the laminating adhesive composition according to the present invention, a metal layer, such as an aluminum foil, a polyolefin sheet, such as a polyethylene sheet or a polypropylene sheet, and one or more types of plastic layers, for example, a polyester layer, such as a polyethylene terephthalate layer.

The laminating adhesive composition according to the present invention is dissolved/dispersed at any ratio in an appropriate solvent or dispersant, such as an ester-based solvent, a ketone-based solvent, or an solvent of an aromatic hydrocarbon, an aliphatic hydrocarbon, or an alicyclic hydrocarbon, applied to a metal foil by a known applying method, such as roll coating, gravure coating, or bar coating, and dried to form an adhesive layer.

The dry application weight of the laminating adhesive composition according to the present invention is preferably within the range of 0.5 to 20.0 $g/m^2$. A dry application weight of less than 0.5 $g/m^2$ causes deterioration of continuous and uniform application. On the other hand, a dry application weight of more than 20.0 $g/m^2$ causes deterioration of ease of removing solvent after application and leads to tremendous deterioration of workability, and the remaining solvent causes some problems.

The laminate according to the present invention is obtained by applying the laminating adhesive composition according to the present invention to one side of a metal foil, layering a plastic layer on the applied laminating adhesive composition, and bonding the layer by dry lamination. The temperature of the laminate roller is preferably about room temperature to 120° C., and the pressure thereof is preferably about 3 to 300 $kg/cm^2$.

After the laminate according to the present invention is produced, aging is preferably performed. The conditions of the aging are as follows. The preferable temperature is 25° C. to 80° C., and the time is 12 to 240 hours. While aging is performed, adhesive strength is generated.

(Secondary Battery)

The laminate according to the present invention may be used as an electrolyte solution sealing film or an electrode protective film of primary or secondary batteries. In these cases, the laminate is used with the plastic layer in contact with a polar organic solvent and/or a salt. In particular, the laminate is suitably used as an electrolyte solution sealing film or an electrode protective film of secondary batteries, particularly such as a nonaqueous electrolyte battery and a solid battery, when used in contact with a nonaqueous electrolyte containing a polar organic solvent and a salt. In this case, the laminate may be heat-sealed with the plastic layer folded inward to be used as a sealing bag for batteries. The adhesive used in the present invention has excellent heat-sealing properties, thereby preventing leakage of a nonaqueous electrolyte and leading to long-term use of batteries.

Examples of the polar organic solvent include polar aprotic solvents, such as alkyl carbonates, esters, and ketones. Specific examples include ethylene carbonate, propylene carbonate, butylene carbonate, dimethyl carbonate, ethyl methyl carbonate, diethyl carbonate, γ-butyrolactone, 1,2-dimethoxyethane, tetrahydrofuran, 2-methyltetrahydrofuran, 1,3-dioxolane, 4-methyl-1,3-dioxolane, methyl formate, 4-methyl-1,3-dioxomethyl formate, methyl acetate, and methyl propionate.

Examples of the salt include alkali metal salts, such as lithium salts, sodium salts, and potassium salts. Lithium salts, such as $LiPF_6$, $LiBF_4$, and Li-imide, are typically used for batteries.

The nonaqueous electrolyte is prepared by dissolving 0.5 to 3 mmol of the alkali metal salt in a polar aprotic organic solvent, such as a cyclic carbonate, a chain carbonate, or a mixture thereof.

When the laminate according to the present invention is used in contact with the polar solvent and/or the salt, particularly, with a nonaqueous electrolyte that is a mixture of the polar solvent and the salt, delamination between layers, such as a metal layer, an adhesive layer, and a plastic layer, does not occur, and thus the laminate can be used for a long term.

A battery according to the present invention is a battery including a battery electrolyte solution sealing film formed of the laminate or a battery electrode protective film formed of the laminate. In the battery according to the present invention, delamination between layers does not occur in the film, and leakage of the nonaqueous electrolyte is prevented. Thus, the battery is stably used for a long term.

As described above, the laminate according to the present invention has high adhesive strength between a metal layer and a plastic layer and high resistance to a polar organic solvent or a salt. Even when the laminate is in contact with a nonaqueous electrolyte or the like, delamination between layers does not occur. Thus, a battery including a battery electrolyte solution sealing film formed of the laminate or a battery electrode protective film formed of the laminate and a secondary battery including a secondary battery electrolyte solution sealing film formed of the laminate or a secondary battery electrode protective film formed of the laminate are stably used for a long term.

EXAMPLES

Hereinafter, the present invention will be specifically described with reference to Examples. "Parts" refers to parts by mass.

The structures of various polyolefin resins (A) were analyzed by $^{13}C$ NMR. From the spectra, the structures of contained monomers were specified.

apparatus: ECX-400P (manufactured by JEOL LTD.)
measurement solvent: $CDCl_3$
measuring temperature: 25° C.
the number of integrations: 1000

Figure 2:
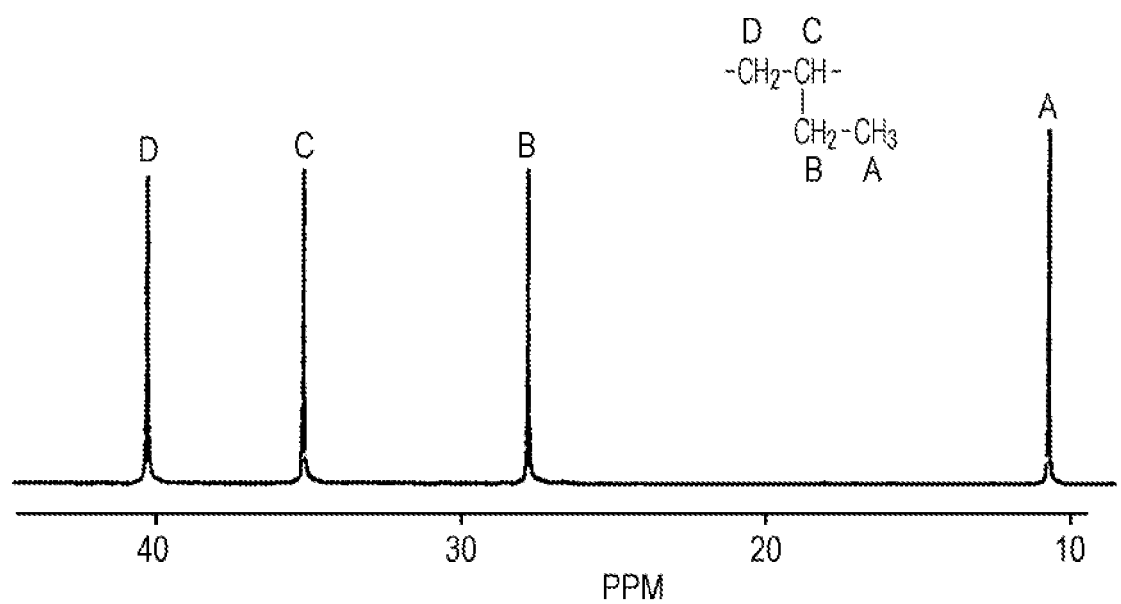
FIG. 2 is a $^{13}$C NMR chart of a polybutene-1 used as a standard sample.
Figure 3:
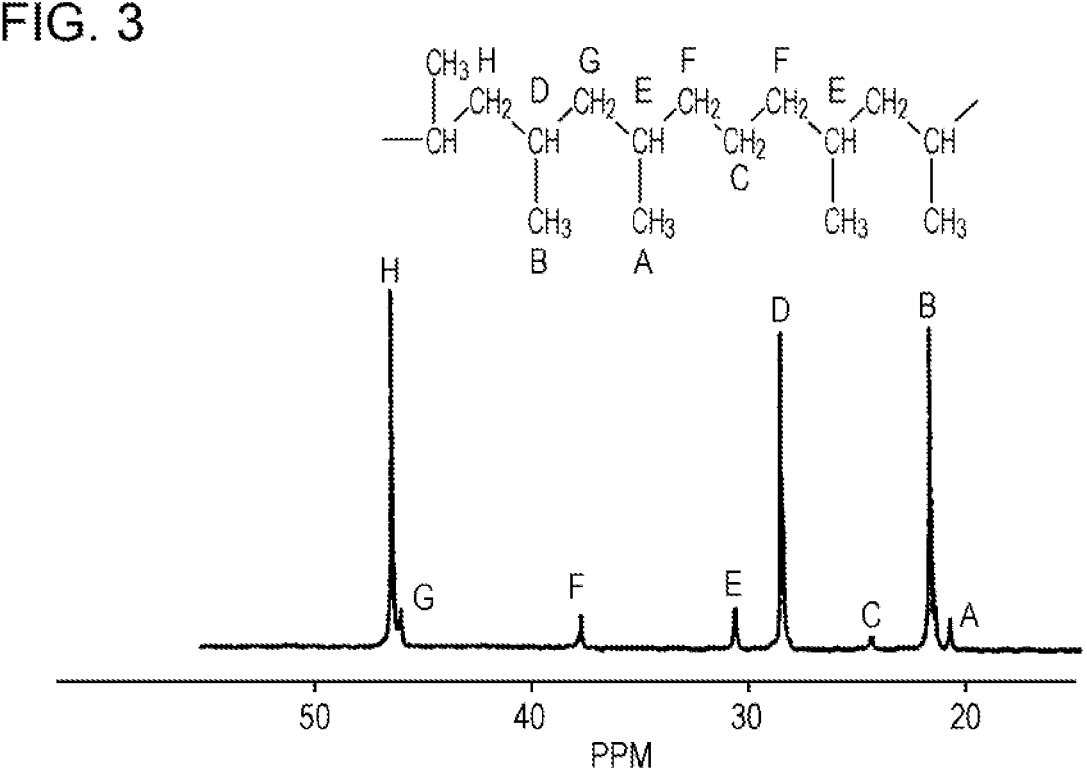
FIG. 3 is a $^{13}$C NMR chart of a polypropylene (copolymer with ethylene) used as a standard sample.

The charts in FIGS. 1 to 3 were quoted from "Infrared Absorption and $^{13}C$ NMR Spectra of Main Polymers" (The Japan Society for Analytical Chemistry/Polymer Analysis Research Society).

Example 1

A hundred parts of HARDLEN NS-2002, 0.01 parts of CUREZOL 2E4MZ, and 0.5 parts of Denacol EX-321 were placed and stirred well, and 5 g/m² (dry) of the mixture was applied to an aluminum foil by using a bar coater. After dried at 80° C. for 1 min, the aluminum foil was bonded to a CPP film at 100° C. to produce a coated product. Then, after aging was performed at 60° C. for five days, the initial adhesive strength was measured.

(Example 2) to (Example 5)

Other components were blended in accordance with Table 1, and adhesives were produced in the same manner as in Example 1. In addition, each laminate was produced by a method the same as the method for producing a laminate 1.

The adhesive property and electrolyte solution resistance (retention percentage) of the laminate in each Example were evaluated. The results are summarized in Table 1.

Conditions of each test are as follows.

(Measurement of Initial Adhesive Strength)

A sample was cut so as to have a width of 15 mm, and 180° C. peel strength (180° C.N/15 mm) was measured by using TENSILON (manufactured by A&D Company, Limited).

(Method for Measuring Crystallization Peak Temperature and Crystallization Peak Heat Quantity)

In the present invention, the crystallization peak temperature and the crystallization peak heat quantity were measured under the following conditions.

apparatus: Hitachi High-Technologies Corporation/X-DSC7000
container: Hitachi High-Technologies Corporation/open-type aluminum container
conditions: sample 5 mg, reference: empty container, atmosphere: nitrogen flow 20 mL/min
measuring temperature: 30° C. (0 min)→−10° C./min→ −80° C. (0 min)→10° C./min→200° C./min (Retention Percentage of Electrolyte Solution Resistance)

A laminate was immersed in an electrolyte solution "ethylene carbonate:ethyl methyl carbonate:dimethyl carbonate=1:1:1 (wt %)+LiPF$_6$: 1 mol+vinylene carbonate: 1 wt %" at 85° C. for seven days. With reference to the retention percentage of the adhesive strength before and after the immersion, evaluation was performed as follows.

Good: 60% or more, Fair: 50% to 60%, Poor: 50% or less

Figure 4:
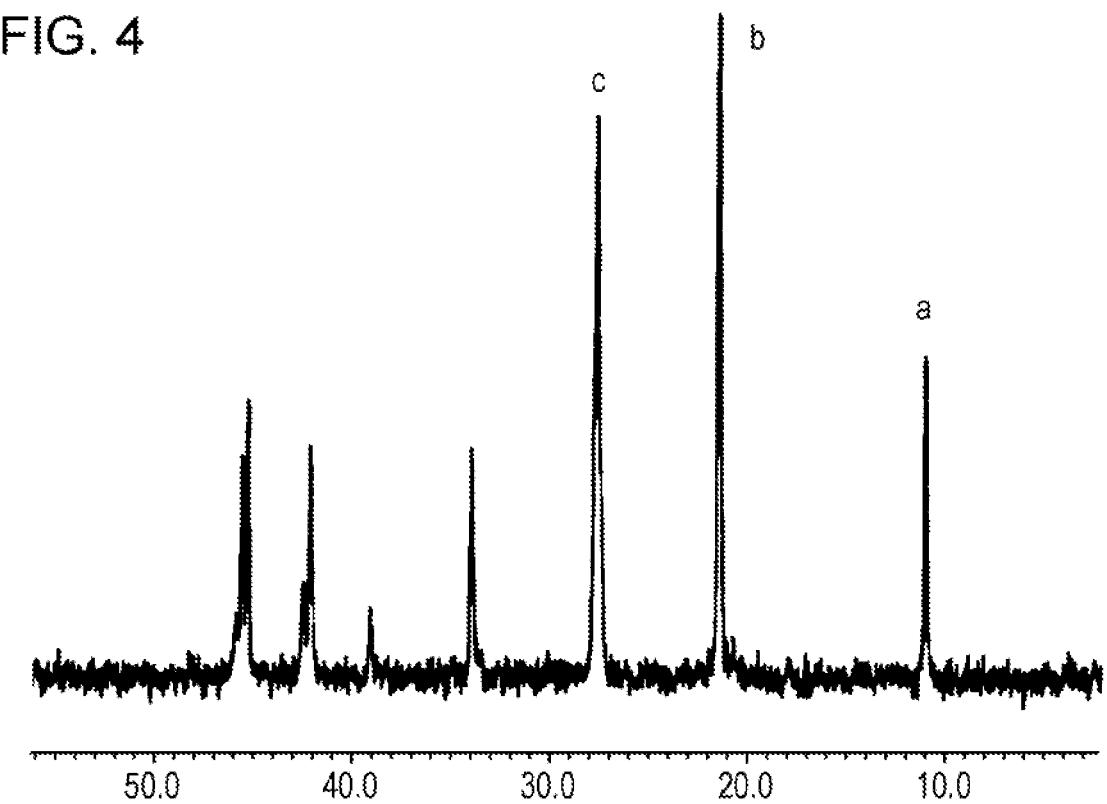
FIG. 4 is a $^{13}$C NMR chart of HARDLEN NS-2002, which is used as a polyolefin resin (A) in Examples 1 to 4.

HARDLEN NS-2002 (manufactured by TOYOBO Co., Ltd.), modified polyolefin resin, non-volatile content 20%, crystallization peak temperature 36.1° C., crystallization peak heat quantity 20.2 mj/mg (refer to the NMR chart in FIG. 4)

Figure 5:
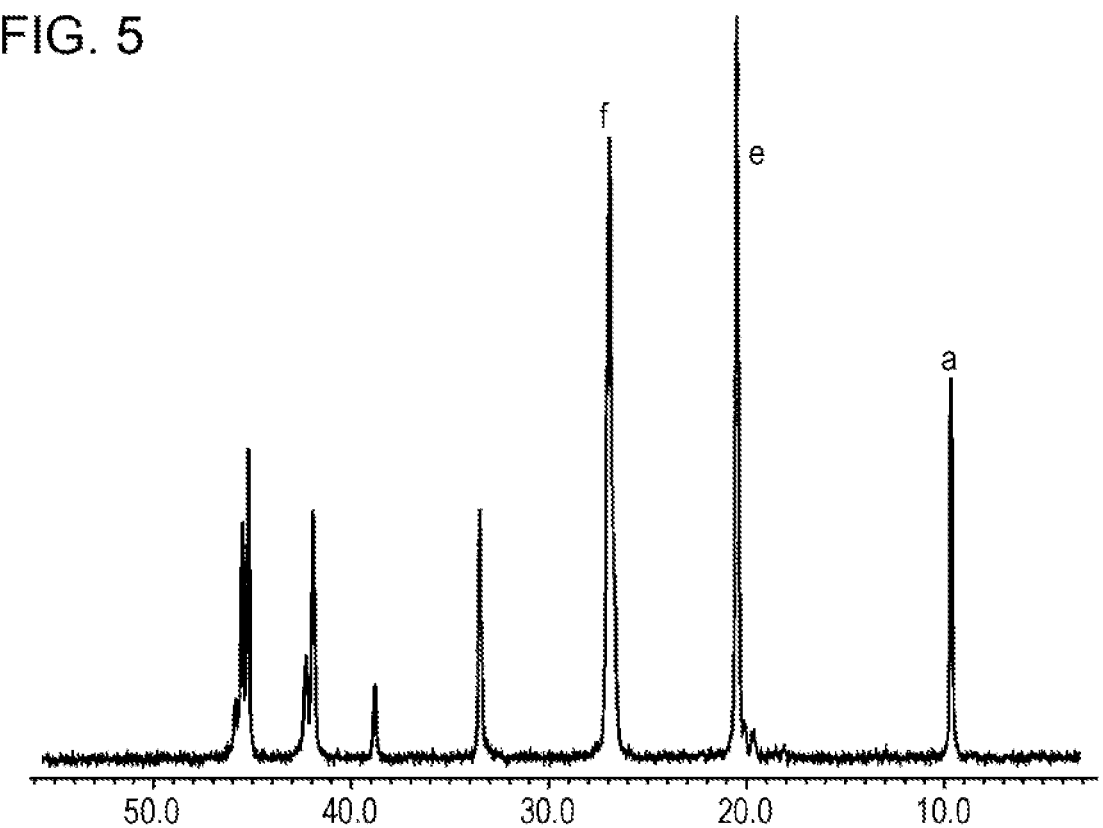
FIG. 5 is a $^{13}$C NMR chart of GMP5070E, which is used as the polyolefin resin (A) in Example 5.

GMP5070E (manufactured by LOTTE Chemical Corporation), modified polyolefin resin, non-volatile content 100%, crystallization peak temperature 28.8° C., crystallization peak heat quantity 31.0 mj/mg (refer to the NMR chart in FIG. 5)

CUREZOL 2E4MZ (manufactured by SHIKOKU CHEMICALS CORPORATION), imidazole, non-volatile content 100%

U-CAT SA 1 (manufactured by San-Apro Ltd.), DBU-phenoxide, non-volatile content 100%

U-CAT SA 102 (manufactured by San-Apro Ltd.), DBU-octylate, non-volatile content 100%

FTR-8120 (manufactured by Mitsui Chemicals, Inc.), tackifier, non-volatile content 100%

Denacol EX-321 (manufactured by Nagase ChemteX Corporation), epoxy resin, epoxy equivalent 140, non-volatile content 100%

EPICLON 860 (manufactured by DIC Corporation), bisphenol A-type epoxy resin, epoxy equivalent 240, non-volatile content 100%

(Comparative Example 1) to (Comparative Example 5)

Blending was performed in accordance with Table 2, and laminates in Comparative Examples were produced in the same manner as in Examples. The initial adhesive strength and electrolyte solution resistance (retention percentage) of such laminates were evaluated. The results are summarized in Table 2.

TABLE 1

|  | Example 1 | Example 2 | Example 3 | Example 4 | Example 5 |
| --- | --- | --- | --- | --- | --- |
| HARDLEN NS-2002 | 100.0 | 100.0 | 100.0 | 100.0 |  |
| GMP5070E |  |  |  |  | 20.0 |
| CUREZOL 2E4MZ | 0.01 |  |  |  |  |
| Triphenylphosphine |  | 0.1 |  |  | 0.05 |
| U-CAT SA 1 |  |  | 0.05 |  |  |
| U-CAT SA 102 |  |  |  | 0.05 |  |
| FTR-8120 |  | 0.2 |  | 0.2 | 0.2 |
| Denacol EX-321 | 0.5 | 0.2 | 0.2 | 0.7 | 0.4 |
| EPICLON 860 |  | 0.2 | 0.2 | 0.4 |  |
| Initial adhesive strength (180° N/15 mm) | 13.8 | 15.5 | 12.3 | 15.0 | 11.2 |
| Electrolyte solution resistance (Retention percentage) | Good | Good | Good | Good | Good |

TABLE 2

|  | Comparative Example 1 | Comparative Example 2 | Comparative Example 3 | Comparative Example 4 | Comparative Example 5 |
|---|---|---|---|---|---|
| GMP3020E | 100.0 | | | | |
| GMP7550E | | 100.0 | 100.0 | | |
| AUROREN 350S | | | | 100.0 | |
| AUROREN 550S | | | | | 100.0 |
| CUREZOL 2E4MZ | 0.05 | | 0.05 | | |
| U-CAT SA 1 | | 0.05 | | 0.05 | 0.05 |
| Denacol EX-321 | 4.2 | 4.0 | 6.0 | 4.0 | 2.0 |
| EPICLON 860 | | 4.0 | 2.0 | 4.0 | |
| Initial adhesive strength (180° N/15 mm) | 10.6 | 12.3 | 11.2 | 10.3 | 7.6 |
| Electrolyte solution resistance (Retention percentage) | Poor | Poor | Poor | Poor | Fair |

Figure 6:
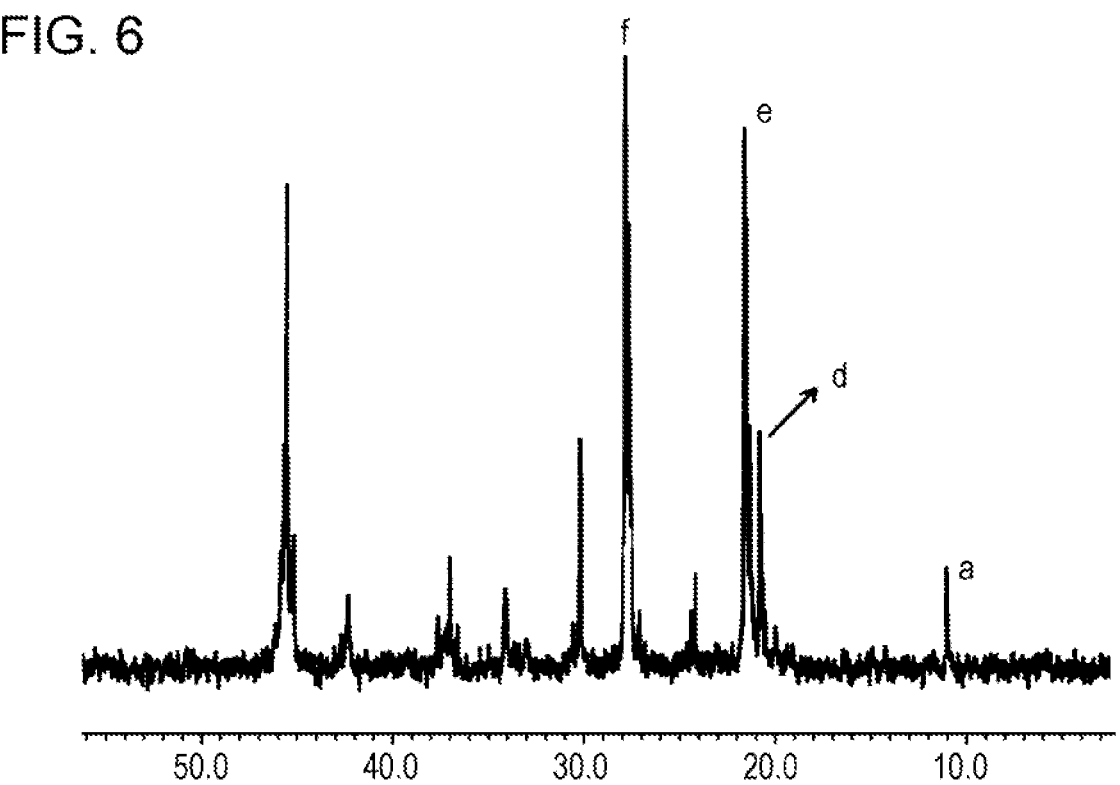
FIG. 6 is a $^{13}$C NMR chart of GMP3020E, which is used as the polyolefin resin (A) in Comparative Example 1.

GMP3020E (manufactured by LOTTE Chemical Corporation), modified polyolefin resin, non-volatile content 100%, crystallization peak temperature 19.5° C., crystallization peak heat quantity 16.0 mj/mg (Refer to the NMR Chart in FIG. 6)

Figure 7:
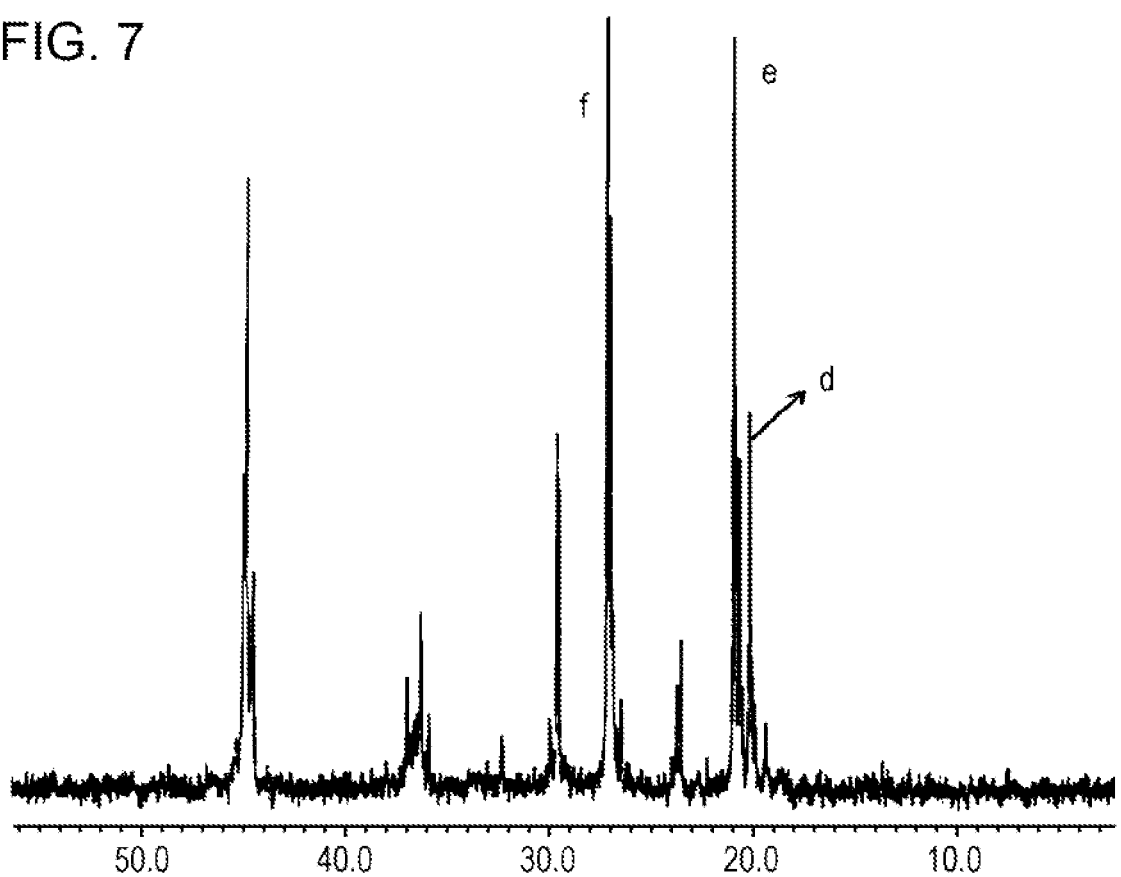
FIG. 7 is a $^{13}$C NMR chart of AUROREN 350S, which is used as the polyolefin resin (A) in Comparative Example 4.

GMP7550E (manufactured by LOTTE Chemical Corporation), modified polyolefin resin, non-volatile content 100%, crystallization peak temperature 24.6° C., crystallization peak heat quantity 19.1 mj/mg AUROREN 350S (manufactured by Nippon Paper Industries Co., Ltd.), modified polyolefin resin, non-volatile content 100%, crystallization peak temperature 8.6° C., crystallization peak heat quantity 3.9 mj/mg (refer to the NMR chart in FIG. 7)

Figure 8:
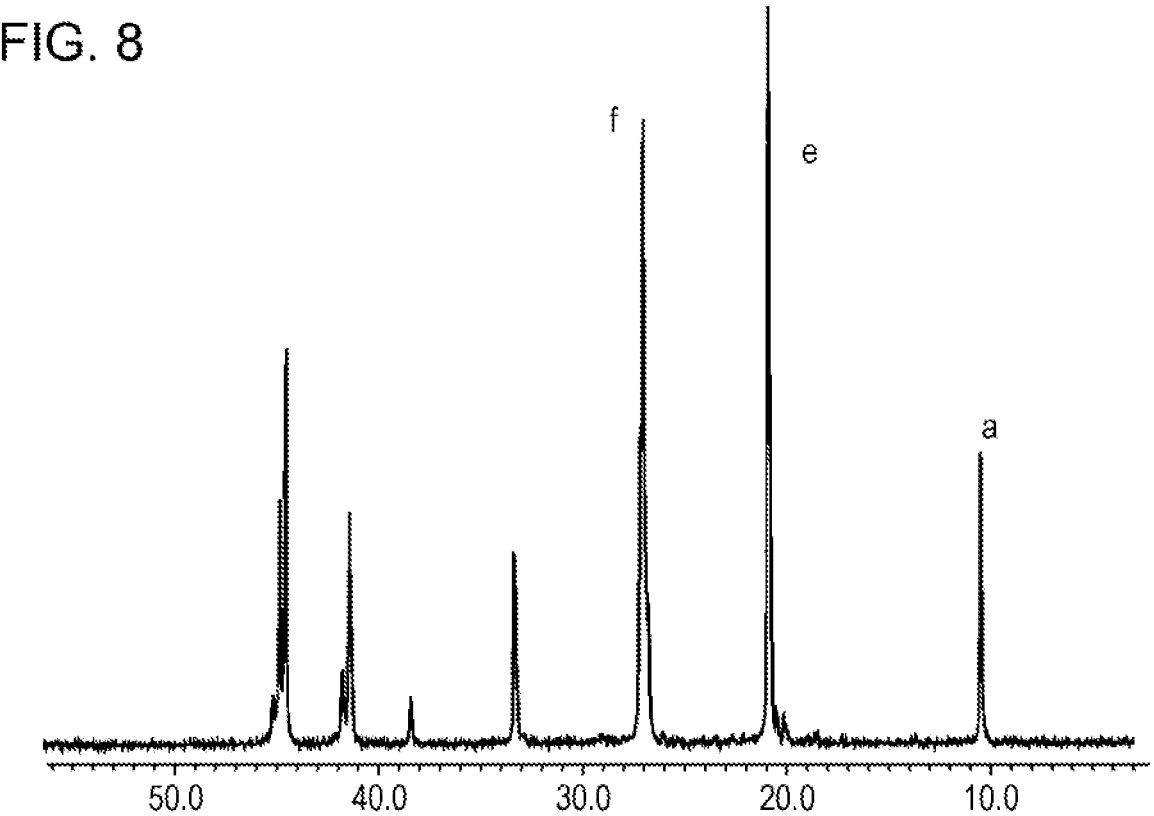
FIG. 8 is a $^{13}$C NMR chart of AUROREN 550S, which is used as the polyolefin resin (A) in Comparative Example 5.

AUROREN 550S (manufactured by Nippon Paper Industries Co., Ltd.), modified polyolefin resin, non-volatile content 100%, crystallization peak temperature 38.9° C., crystallization peak heat quantity 37.0 mj/mg (refer to the NMR chart in FIG. 8) CUREZOL 2E4MZ (manufactured by SHIKOKU CHEMICALS CORPORATION), imidazole, non-volatile content 100%

U-CAT SA 1 (manufactured by San-Apro Ltd.), DBU-phenoxide, non-volatile content 100%

Denacol EX-321 (manufactured by Nagase ChemteX Corporation), epoxy resin, epoxy equivalent 140, non-volatile content 100%

EPICLON 860 (manufactured by DIC CORPORATION), bisphenol A-type epoxy resin, epoxy equivalent 240, non-volatile content 100%

It has been found in comparison with a standard sample in NMR measurement that, in HARDLEN NS-2002 and GMP5070E, which were each used as the polyolefin resin (A) in Examples, propylene and 1-butene are the main monomers. In addition, HARDLEN NS-2002 and GMP5070E have a crystallization peak temperature within the range of 28° C. to 38° C.

On the other hand, it has been found in comparison with a standard sample in NMR measurement that, in GMP3020E, GMP7550E, AUROREN 350S, and AUROREN 550S, which were each used as the polyolefin resin (A) in Comparative Examples, propylene and 1-butene are the main monomers; however, GMP3020E, GMP7550E, AUROREN 350S, and AUROREN 550S have a crystallization peak temperature outside the range of 28° C. to 38° C.

Thus, in the case where propylene and 1-butene are the main monomers in the polyolefin resin (A), when the polyolefin resin (A) has a crystallization peak temperature within the range of 28° C. to 38° C., electrolyte solution resistance (retention percentage) is high, and an object of the present invention can be achieved; however, if the temperature is outside the range, it has been found that the object is not achieved.

From the above results, it has been found that the laminate obtained by using the present adhesive has high initial adhesive strength and high electrolyte solution resistance (retention percentage).

INDUSTRIAL APPLICABILITY

The laminating adhesive according to the present invention has excellent adhesion between a metal layer and a plastic layer and electrolyte solution resistance even after low-temperature aging, and the retention percentage of the resistance is high. Thus, a laminate obtained by using the present adhesive has electrolyte solution resistance even after low-temperature aging, and delamination between layers does not occur over time. Therefore, the laminate is suitably used as a laminate for secondary batteries.

REFERENCE SIGNS LIST a peak indicating a methyl group of polybutene-1 (corresponding to A in FIG. 2)
b peak indicating a methyl group of polypropylene (corresponding to A in FIG. 1)
c peak indicating a methylene group of polypropylene (corresponding to B in FIG. 1)
d methyl group of a copolymer with polyethylene (corresponding to A in FIG. 3)
e peak indicating a methyl group of polypropylene (corresponding to A in FIG. 1)
f peak indicating a methylene group of polypropylene (corresponding to B in FIG. 1)

The invention claimed is:

1. A secondary battery comprising a laminate,
the laminate comprising a laminating adhesive, and a metal layer,
wherein the laminating adhesive comprises a polyolefin resin (A) and an epoxy compound (B), wherein the polyolefin resin (A) is a polymer in which propylene and 1-butene are main monomers and has a crystallization peak temperature within a range of 28° C. to 38° C., wherein an essential component of the epoxy compound (B) is an epoxy compound that has two or more epoxy groups per molecule and one or more hydroxyl groups per molecule and that has a weight-average molecular weight of 3000 or less.

2. The secondary battery according to claim 1, wherein the polyolefin resin (A) contains a modified polyolefin resin having an acid value of 1 to 200 mgKOH/g and/or a modified polyolefin resin having a hydroxyl value of 1 to 200 mgKOH/g.

3. The secondary battery according to claim 1, wherein 0.01 to 30 parts by mass of the epoxy compound (B) is blended relative to 100 parts by mass of the polyolefin resin (A).

4. The secondary battery according to claim 1, wherein the laminating adhesive further comprises a thermoplastic elastomer, a tackifier, a catalyst, a phosphate compound, a melamine resin, a silane coupling agent, or a reactive elastomer.

5. The secondary battery according to claim 1, wherein the laminating adhesive is provided between the metal layer and a polyolefin resin layer.

6. A method for producing the second battery according to claim 5, the method comprising performing aging of the laminate within a range of 25° C. to 80° C.

7. The secondary battery according to claim 5, wherein the laminate is used as an electrolyte solution sealing film or an electrode protective film.

8. A laminate comprising a laminating adhesive and a metal layer, wherein the laminating adhesive comprises a polyolefin resin (A) and an epoxy compound (B), wherein the polyolefin resin (A) is a polymer in which propylene and 1-butene are main monomers and has a crystallization peak temperature within a range of 28° C. to 38° C., wherein an essential component of the epoxy compound (B) is an epoxy compound that has two or more epoxy groups per molecule and one or more hydroxyl groups per molecule and that has a weight-average molecular weight of 3000 or less.

9. The laminate according to claim 8, wherein the polyolefin resin (A) contains a modified polyolefin resin having an acid value of 1 to 200 mgKOH/g and/or a modified polyolefin resin having a hydroxyl value of 1 to 200 mgKOH/g.

10. The laminate according to claim 8, wherein 0.01 to 30 parts by mass of the epoxy compound (B) is blended relative to 100 parts by mass of the polyolefin resin (A).

11. The laminate according to claim 8, wherein the laminating adhesive further comprise a thermoplastic elastomer, a tackifier, a catalyst, a phosphate compound, a melamine resin, a silane coupling agent, or a reactive elastomer.

12. The laminate according to claim 8, wherein the laminating adhesive is provided between the metal layer and a polyolefin resin layer.

13. An electrolyte solution sealing film or an electrode protective film of primary or secondary batteries comprising the laminate according to claim 8.

* * * * *